United States Patent
Do et al.

(10) Patent No.: US 8,820,342 B2
(45) Date of Patent: Sep. 2, 2014

(54) ACTUATOR CONTROL DEVICE AND METHOD

(75) Inventors: Dan Nguyen Do, Houston, TX (US); Robert Stocker Moreland, Red Rock, TX (US)

(73) Assignee: Tapco International Corporation, Channelview, TX (US)

( * ) Notice: Subject to any disclaimer, the term of this patent is extended or adjusted under 35 U.S.C. 154(b) by 488 days.

(21) Appl. No.: 13/283,950

(22) Filed: Oct. 28, 2011

(65) Prior Publication Data
US 2012/0104295 A1     May 3, 2012

Related U.S. Application Data

(60) Provisional application No. 61/408,142, filed on Oct. 29, 2010.

(51) Int. Cl.
*F16K 31/02*     (2006.01)

(52) U.S. Cl.
USPC ............... 137/15.01; 251/129.04; 318/564; 700/79; 700/282

(58) Field of Classification Search
USPC ............... 137/15.01; 251/129.04; 318/564; 700/282, 79
See application file for complete search history.

(56) References Cited

U.S. PATENT DOCUMENTS

| | | | |
|---|---|---|---|
| 3,190,586 A * | 6/1965 | Righton | 318/564 |
| 3,469,162 A * | 9/1969 | Goslin | 318/564 |
| 6,616,121 B2 * | 9/2003 | Asakura et al. | 251/129.04 |
| 7,424,642 B2 * | 9/2008 | Howell et al. | 318/564 |

* cited by examiner

*Primary Examiner* — Eric Keasel
(74) *Attorney, Agent, or Firm* — Pearne & Gordon LLP

(57) ABSTRACT

A device for controlling an actuator includes an input interface that receives a plurality of input signals including a setpoint command signal and a feedback signal. An output interface provides a drive signal to the actuator. First, second, and third redundant loop controllers processes the setpoint command signal and the feedback signal to generate respective actuator control signals. A primary controller compares the actuator control signals to determine whether at least two are substantially similar. The device outputs the drive signal to the actuator according to an actuator control signals that has been determined by the primary controller to be substantially similar to another. Any one of the redundant loop controllers is hot swappable with a replacement loop controller such that loop controller redundancy is operatively maintained by the device in controlling the actuator while one of the redundant loop controllers is hot swapped.

25 Claims, 3 Drawing Sheets

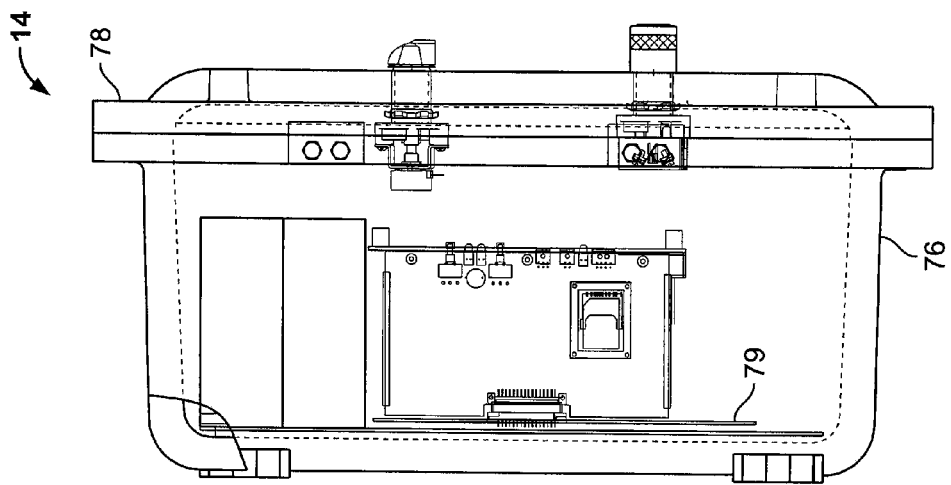
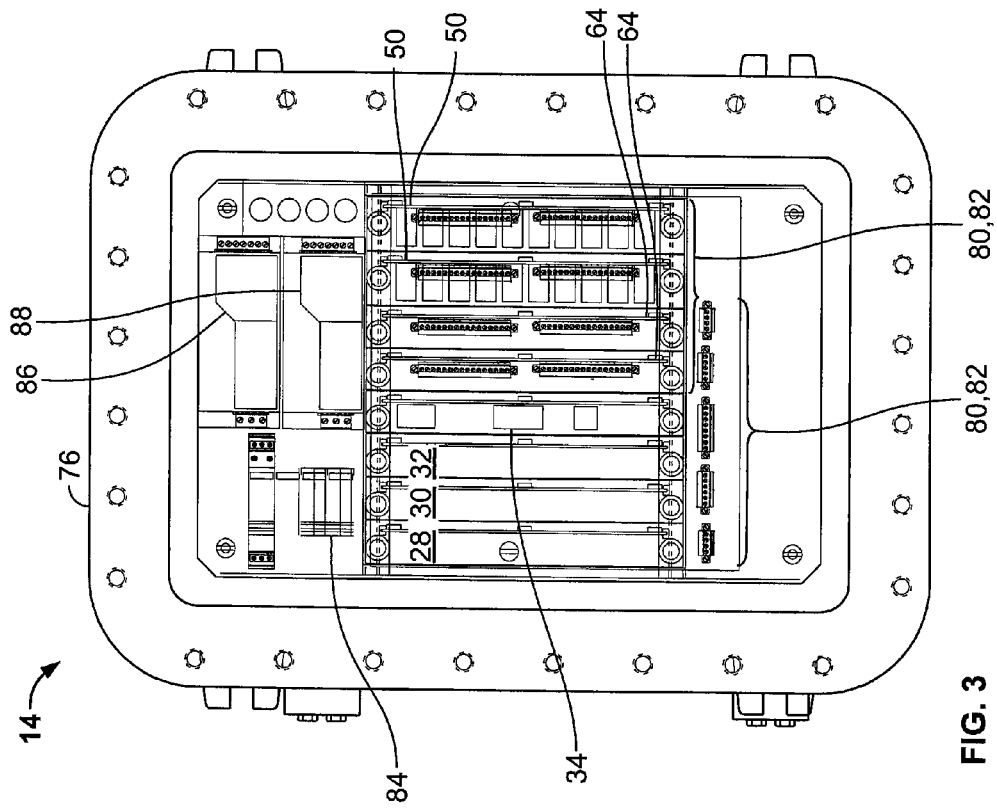
FIG. 4
FIG. 3

ACTUATOR CONTROL DEVICE AND METHOD

CROSS-REFERENCE TO RELATED APPLICATIONS

Benefit of U.S. Provisional Patent Application Ser. No. 61/408,142 filed Oct. 29, 2010, is hereby claimed and the disclosure incorporated herein by reference.

BACKGROUND OF THE INVENTION

1. Field of the Invention

The present invention relates to controllers for controlling actuators and/or valves. An example of such a controller is a digital valve controller that is programmable and controls an associated valve actuator based on various calibration parameters and input signals. The valve actuator, in turn, controls the position of a valve.

2. Description of Related Art

In conventional valve controllers, repairing a failed loop controller typically requires the normal operation of the valve to be interrupted. For example, the valve would be taken off line or otherwise shut down while its controller is repaired. Repairing the loop controller often involves a recalibration process, which can require fully stroking the valve to properly calibrate the controller. It might be inconvenient at the least, and possibly costly and undesirable, to take the valve off line or shut it down while the controller is repaired. Recalibrating the loop controller can be time consuming and, if done incorrectly, can lead to process control errors and additional down time. If the valve must be fully stroked to properly calibrate the controller, and the controlled process will not permit fully stroking the valve, then the valve must be taken off line so that the controller can be calibrated. It would be useful to provide a valve controller that mitigates one or more of the above shortcomings.

BRIEF SUMMARY OF THE INVENTION

Provided is a device for controlling an actuator. An input interface receives a plurality of input signals. The input signals include a setpoint command signal and a feedback signal. An output interface provides a drive signal to the actuator. A first redundant loop controller processes the setpoint command signal and the feedback signal to generate a first actuator control signal. A second redundant loop controller processes the setpoint command signal and the feedback signal to generate a second actuator control signal. A third redundant loop controller processes the setpoint command signal and the feedback signal to generate a third actuator control signal. A primary controller compares the first actuator control signal, the second actuator control signal, and the third actuator control signal to determine whether at least one of the actuator control signals is substantially similar to another of the actuator control signals. The device outputs the drive signal to the actuator according to the at least one of the actuator control signals that has been determined by the primary controller to be substantially similar to another of the actuator control signals. Any one of the first redundant loop controller, the second redundant loop controller, and the third redundant loop controller is hot swappable with a replacement loop controller such that loop controller redundancy is operatively maintained by the device in controlling the actuator while one of the redundant loop controllers is hot swapped.

Further provided is a device for controlling an actuator. An input interface receives a plurality of input signals. The input signals include a setpoint command signal and a feedback signal. An output interface provides a drive signal to the actuator. A first redundant loop controller processes the setpoint command signal and the feedback signal to generate a first actuator control signal. A second redundant loop controller processes the setpoint command signal and the feedback signal to generate a second actuator control signal. A third redundant loop controller processes the setpoint command signal and the feedback signal to generate a third actuator control signal. A memory is associated with at least one of a primary controller, the first redundant loop controller, the second redundant loop controller, and the third redundant loop controller. The memory stores calibration parameters for processing the setpoint command signal and the feedback signal. The primary controller compares the first actuator control signal, the second actuator control signal, and the third actuator control signal to determine whether at least one of the actuator control signals is substantially similar to another of the actuator control signals. The device outputs the drive signal to the actuator according to the at least one of the actuator control signals that has been determined by the primary controller to be substantially similar to another of the actuator control signals. Any one of the first redundant loop controller, the second redundant loop controller, and the third redundant loop controller is hot swappable with a replacement loop controller. The device loads the calibration parameters for processing the setpoint command signal and the feedback signal from the memory into the replacement loop controller when one of the redundant loop controllers is hot swapped.

Further provided is a device for controlling an actuator. An input interface receives a plurality of input signals. The input signals include a setpoint command signal and a feedback signal. An output interface provides a drive signal to the actuator. A first redundant loop controller processes the setpoint command signal and the feedback signal to generate a first actuator control signal. A second redundant loop controller processes the setpoint command signal and the feedback signal to generate a second actuator control signal. A third redundant loop controller processes the setpoint command signal and the feedback signal to generate a third actuator control signal. A memory is associated with at least one of the first redundant loop controller, the second redundant loop controller, and the third redundant loop controller. The memory stores calibration parameters for processing the setpoint command signal and the feedback signal. The device outputs the drive signal to the actuator according to at least one of the actuator control signals. Any one of the first redundant loop controller, the second redundant loop controller, and the third redundant loop controller is hot swappable with a replacement loop controller such that loop controller redundancy is operatively maintained by the device in controlling the actuator while one of the redundant loop controllers is hot swapped. The device loads the calibration parameters for processing the setpoint command signal and the feedback signal from the memory into the replacement loop controller when one of the redundant loop controllers is hot swapped.

Further provided is a method for controlling a valve actuator by a valve controller. The valve controller receives a plurality of input signals including an setpoint command signal and a feedback signal. A first redundant loop controller generates a first actuator control signal based on the setpoint command signal and the feedback signal. A second redundant loop controller generates a second actuator control signal based on the setpoint command signal and the feedback signal. A third redundant loop controller generates a third actuator control signal based on the setpoint command signal and the feedback signal. The valve controller compares the first actuator control signal, the second actuator control signal, and the third actuator control signal and determines whether at least one of the actuator control signals is substantially similar to another of the actuator control signals. The valve controller outputs a drive signal to the valve actuator according to the at least one of the actuator control signals that is determined to be substantially similar to another of the actuator control signals. The valve controller receives a replacement loop controller as a hot swapped replacement for one of the first redundant loop controller, the second redundant loop controller, and the third redundant loop controller. Two of the first redundant loop controller, the second redundant loop controller, and the third redundant loop controller maintain redundant control of the valve actuator while said one of the first redundant loop controller, the second redundant loop controller, and the third redundant loop controller is hot swapped. Stored calibration parameters for processing the setpoint command signal and the feedback signal are automatically loaded into the replacement loop controller. The calibration parameters match parameters in said one of the first redundant loop controller, the second redundant loop controller, and the third redundant loop controller that is hot swapped.

BRIEF DESCRIPTION OF THE DRAWINGS

FIG. 3 is a pictorial front view of an example embodiment of the valve controller; and FIG. 4 is a pictorial side view of the example embodiment of the valve controller.

DETAILED DESCRIPTION OF THE INVENTION

The following description explains the invention in the context of a valve controller controlling a valve actuator and valve. However, it is to be appreciated that the disclosed controller need not be a valve controller and that the actuator need not be a valve actuator. The disclosed controller is suitable for controlling various types of actuators and positionable devices. Thus, the disclosed controller is not intended to be limited solely to valve control applications.

Figure 1:
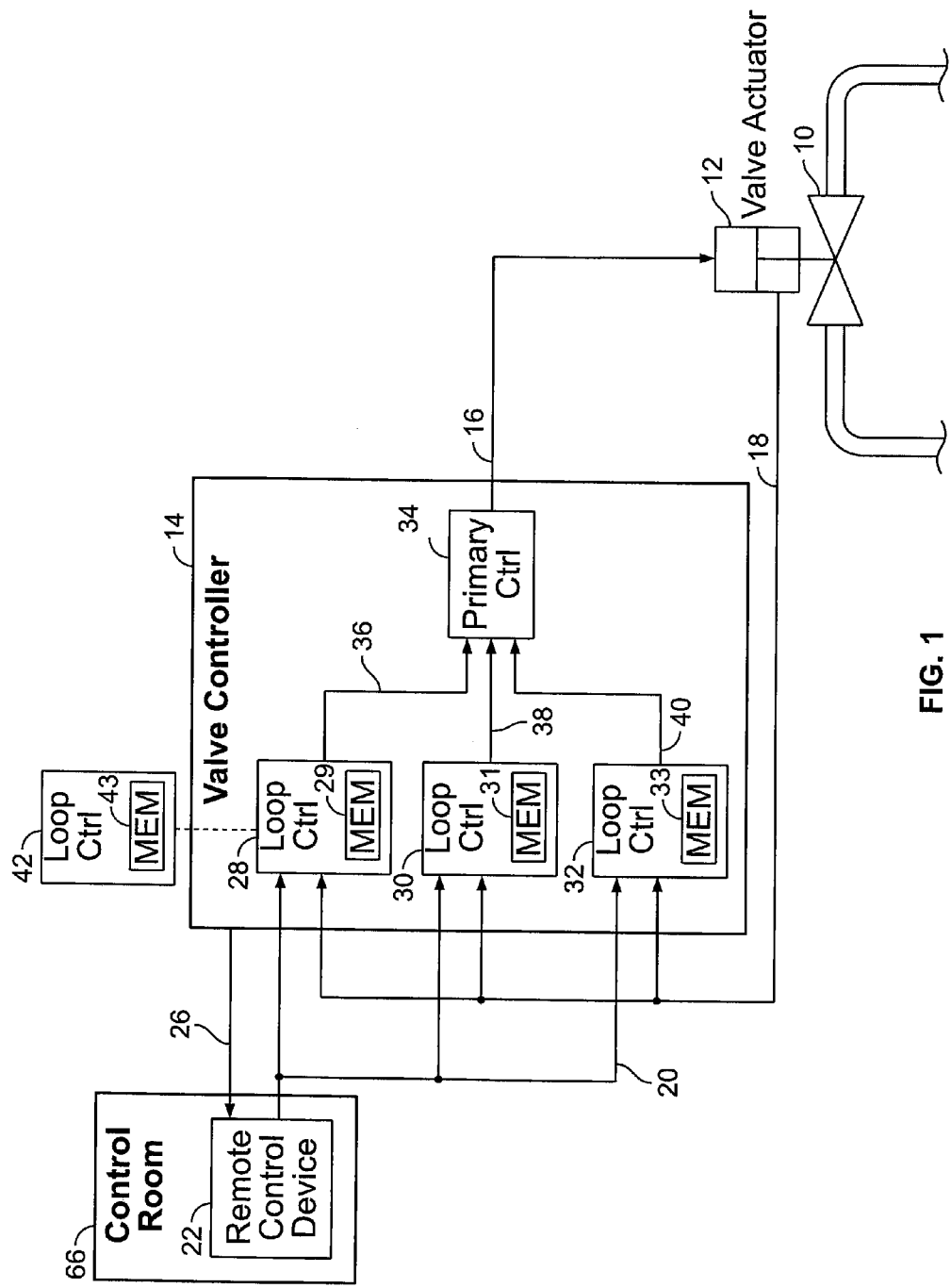
FIG. 1 is a schematic block diagram of an example valve controller.

FIG. 1 is a high-level schematic block diagram of a device for controlling a valve 10 (e.g., slide, plug, butterfly, globe, gate, etc.) The valve 10 is positioned by an actuator 12. The actuator 12 in FIG. 1 is shown schematically as being a hydraulic actuator. However, the actuator 12 could be any type of actuator suitable for positioning a valve, such as a motorized actuator or a pneumatic actuator, for example.

A valve controller 14, such as a digital valve controller, provides a drive signal 16 to the actuator 12. The actuator 12 adjusts its position according to the drive signal 16. Typically, the drive signal 16 is a 4-20 mA signal. However, other types of drive signals are possible, such as a 0-5 VDC signal, or digital communications signals, etc.

The valve controller 14 receives one or more feedback signals 18 from the actuator 12. The valve controller 14 processes the feedback signals 18 to determine whether the valve 10 is properly positioned and how to adjust the drive signal 16. Like the drive signal 16, the feedback signals can be analog signals (e.g., 4-20 ma, 0-5 VDC, etc.) or digital signals. Example feedback signals 18 include actuator position signals, such as from a linear displacement transducer (LDT) and cylinder pressure signals.

The valve controller 14 includes one or more input interfaces and one or more output interfaces for receiving and providing various signals as discussed herein. The valve controller 14 can be mounted near the actuator 12, such as on a skid with the actuator. In certain embodiments, the valve controller 14 and actuator 12 are built as an integral unit. Alternatively, the valve controller 14 can be mounted remote from the actuator 12, such as in a control room.

The valve controller 14 receives a setpoint command signal 20 from a remote control device 22, such as a process controller located in a control room. The setpoint command signal 20 could be an analog signal or a digital signal, but is typically expected to be a 4-20 mA signal. The valve controller 14 processes the setpoint command signal 20 and the feedback signals 18 according to various calibration parameters stored in the valve controller, to generate the drive signal 16. In generating the drive signal 16, the valve controller 14 can perform proportional-integral (PI) control, proportional-integral-derivative (PID) control, and/or other control algorithms. Example calibration parameters include minimum and maximum current levels for various signals received and generated by the valve controller 14, numerical values associated with such current levels, gains, offsets, setpoints, stroke lengths, valve port areas, and the like. The calibration parameters can be configured through a local user interface at the valve controller 14 or remotely, for example through communications from the remote control device. The calibration parameters can be stored in a memory, such as a non-volatile memory, in the valve controller 14. In FIG. 1, three loop separate loop controllers 28, 30, 32 each include a memory 29, 31, 33 for storing calibration parameters.

The valve controller 14 can provide information concerning its operation and the operation of the actuator and valve to remote devices. For example, the valve controller 14 transmits status information 26 to the remote control device 22, such as valve position, alarms, parameter settings, etc.

In FIG. 1, the valve controller 14 includes three separate loop controllers 28, 30, 32 and a primary controller 34. The loop controllers 28, 30, 32 and primary controller 34 can include processors (e.g., microprocessors, microcontrollers, etc.) and/or integrated and discrete circuitry for performing the functions ascribed to them as discussed herein. In certain embodiments, the primary controller 34 includes both voting controller ("VC") circuitry 34a and system processor ("SP") circuitry 34b (see FIG. 2). A function of the VC circuitry 34a is to conduct two-out-of-three voting using output signals from the loop controllers 28, 30, 32, as discussed below. The SP circuitry 34b performs remaining functions of the primary controller 34, such as alarming, communications, and the like. The three loop controllers 28, 30, 32 are each capable of processing the setpoint command signal 20 and the feedback signal 18 to control the valve actuator 12. The loop controllers 28, 30, 32 process the setpoint command signal 20 and the feedback signal 18 according to their calibration parameters. The loop controllers 28, 30, 32 can have identical calibration parameters, or different calibration parameters from each other. The calibration parameters are stored in the memories 29, 31, 33 of the loop controllers and/or in additional memories within the valve controller 34 (e.g., in a memory of the primary controller 34). In certain embodiments, the valve controller 14 includes more than three loop controllers, for additional redundancy or control of multiple actuators for example.

The primary controller 34, via the SP circuitry 34b for example, coordinates the operations of the loop controllers 28, 30, 32 and performs various functions not done by the loop controllers, such as communicate with the user interface, receive remote programming instructions, etc. Further, the primary controller 34, via the VC circuitry 34a for example, decides which loop controller 28, 30, 32 should control the valve actuator 12 at any given moment. The loop controllers 28, 30, 32 are redundant loop controllers in that they are each capable of processing the setpoint command signal 20 and the feedback signal 18 to control the valve actuator 12; and they operate simultaneously. Each loop controller 28, 30, 32 receives the setpoint command signal 20 and the feedback signal 18 (or is informed of their levels) and processes these signals to generate respective actuator control signals 36, 38, 40. The primary controller 34, via the VC circuitry 34a for example, compares the actuator control signals 36, 38, 40 to determine whether at least two of the actuator control signals are substantially similar to each other (e.g., have an identical level or value, or approximately the same level or value). To make such a determination, the primary controller 34, in particular the VC circuitry 34a, can perform a two-out-of-three voting (2oo3) technique to determine whether two of the actuator control signals 36, 38, 40 are substantially similar. Under normal conditions, each of the loop controllers 28, 30, 32 will generate a substantially similar actuator control signal 36, 38, 40. In this case the primary controller 34, in particular the VC circuitry 34a, can choose any of the loop controllers 28, 30, 32 to control the valve actuator 12.

The actuator control signals 36, 38, 40 can be values internal to the valve controller 14 that are analyzed by primary controller 34. Alternatively, the actuator control signals 36, 38, 40 can be signals for directly controlling the actuator 12, such as 4-20 mA signals. The actual drive signal 16 provided to the actuator 12 can be generated by a loop controller 28, 30, 32, by the primary controller 34, or by other circuitry within the valve controller 14. The drive signal 16 can be the same signal as one of the actuator control signals 36, 38, 40, or a different signal. For example, in certain embodiments the valve controller 14 outputs one of the actuator control signals 36, 38, 40 directly to the valve actuator 12 as the drive signal 16. In other embodiments, the valve controller 14 generates and outputs a different signal, based on the chosen actuator control signal, as the drive signal 16 for the valve actuator 12.

If one of the loop controllers 28, 30, 32 should fail, its actuator control signal will differ from the other two actuator control signals and will not be used by the primary controller 34 to control the valve actuator 12. Such a failure will be recognized by the primary controller 34 when performing 2oo3 voting. In embodiments having voting controller VC circuitry 34a, the VC circuitry can recognize a failure of a loop controller 28, 30, 32 and inform the system processor SP circuitry 34b of the failure. If one of the loop controllers 28, 30, 32 fails, loop controller redundancy is operatively maintained by the valve controller 14 due to the remaining two loop controllers. The valve controller 14 can generate an alarm to inform a user of a loop controller failure.

The loop controllers 28, 30, 32 are hot swappable without interrupting the loop controller redundancy. Thus, a failed loop controller can be hot swapped for a replacement loop controller 42 while the valve controller 14 maintains redundant loop control of the actuator 12, continues to output the drive signal 16 to the actuator, and continues normal control and actuation of the valve 10. The valve 10 can remain online while a loop controller is hot swapped for a replacement controller 42, without interrupting the process controlled by the valve. To facilitate easy removal and replacement of a loop controller, the loop controllers can be configured to plug into the valve controller 14 through an appropriate connector.

The replacement loop controller 42 is calibrated with the parameters of the loop controller that it replaces. Among other parameters, calibration parameters for processing the setpoint command signal 20 and the feedback signal 18 are loaded into the memory 43 of the replacement loop controller 42 by the valve controller 14, so that the replacement controller can properly generate an actuator control signal. The valve controller 14 can automatically load the calibration parameters into the replacement loop controller 42 and bring it online as soon as it is installed, or the valve controller can require some user confirmation before loading the calibration parameters and/or bringing the replacement loop controller online. The calibration parameters loaded into the replacement loop controller 42 can partially or completely match (e.g., have identical values to) those of the controller that it replaces, and can fully calibrate the replacement loop controller so that additional calibration is unnecessary or optional. In an embodiment, the replacement loop controller 42 is calibrated by the loaded calibration parameters without having to fully stroke or partially stroke the valve after the replacement loop controller is installed. Fully or partially stroking the valve to calibrate the replacement loop controller would interrupt normal operations of the valve and the controlled process. While one of the loop controllers 28, 30, 32 is hot swapped for the replacement loop controller 42 and while the valve controller 14 loads the calibration parameters of the hot swapped loop controller into the replacement loop controller, redundant, normal control and actuation of the valve is maintained by the valve controller and actuator without the need to fully or partially stroke the valve 10.

Figure 2:
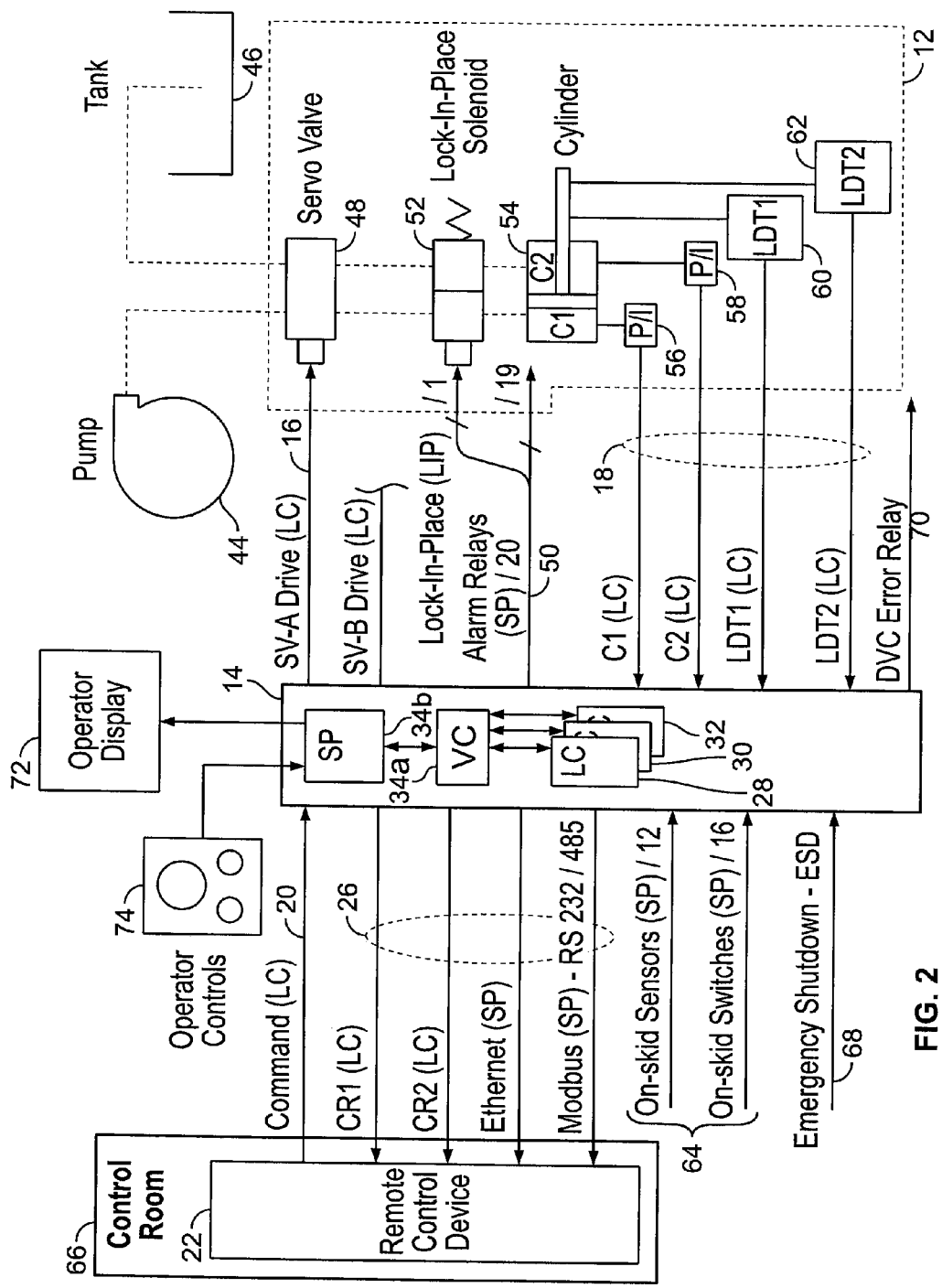
FIG. 2 is a schematic block diagram of the valve controller within an example system.

FIG. 2 provides a more detailed block diagram of the system shown in FIG. 1. In FIG. 2, the actuator is operatively connected to a pump 44 and tank 46, and the entire arrangement can be located on a skid for example. The valve controller 14 provides the drive signal 16 to a servo valve 48 in the actuator 12. The actuator 12 can receive various digital outputs 50 from the valve controller 14, such as alarm relay outputs for example. The actuator 12 can include a lock-in-place solenoid 52 whose operation is controlled by an output from the valve controller 14. The operation of a hydraulic cylinder 54, which is mechanically coupled to the valve (not shown in FIG. 2), is controlled by the servo valve 48 and the lock-in-place solenoid 52. Example feedback signals 18 from the actuator to the valve controller include cylinder pressures from pressure transducers 56, 58 and LDT positions from linear displacement transducers 60, 62. The valve controller 14 can additionally receive input signals 64 from various sensors and switches located with the actuator on the skid. The loop controllers 28, 30, 32 can process various input signals in addition to the setpoint command signal 20 and the feedback signals 18 in generating the actuator control signals.

As noted above, the valve controller 14 can provide information concerning its operation, and the operation of the actuator and valve, to remote devices. For example, the valve controller 14 can provide information to the remote control device 22 that generates the setpoint command signal. The remote control device 22 can be located in a control room 66. Thus, the valve controller 14 can receive the setpoint command signal 20 from the control room 66 and transmit status information 26, such as valve position, alarms, parameter settings, etc., to the control room. Status information can be sent individually over separate control and signal lines (e.g., individual control relay and analog signal outputs) or via digital communications (e.g., Ethernet, Modbus, etc.) between the valve controller 14 and the control room 66. The valve controller 14 can receive an emergency shutdown command signal 68 to trigger a valve shutdown procedure, and the valve controller 14 can generate one or more error alarm signals 70 to inform an operator of an alarm condition within the valve controller (e.g., a failed loop controller).

Within the valve controller 14, FIG. 2 schematically shows the VC circuitry 34a and SP circuitry 34b of the primary controller in bidirectional communication with three loop controllers 28, 30, 32. Communications among the VC circuitry 34a, the SP circuitry 34b, and the loop controllers 28, 30, 32 can include digital communications. Digital communications can occur over one or more communications buses within the valve controller 14. The VC circuitry 34a, SP circuitry 34b, and the loop controllers 28, 30, 32 can also transmit discrete digital and analog signals among each other. For example, the actuator control signals 36, 38, 40 from the loop controllers 28, 30, 32 can be included in digital communications among the VC circuitry 34a, the SP circuitry 34b, and the loop controllers, or be provided as separate analog signals (e.g., 4-20 mA) that are monitored by the VC circuitry and/or the SP circuitry.

The valve controller 14 includes a local user interface (72, 74) for configuring the valve controller, calibrating operating parameters, acknowledging alarms, viewing current operating conditions, etc. The user interface can include a display 72, such as a color LCD display, and various operator controls, including push buttons, rotary encoders and the like. The display 72 can include a touch screen in addition to or in lieu of the operator controls 74.

FIGS. 3 and 4 show, respectively, front and side views of an example embodiment of the valve controller 14. The valve controller 14 includes an enclosure 76 for housing the various modules and circuitry of the valve controller. The enclosure can be a so-called explosion proof enclosure, allowing the valve controller 14 to be placed within hazardous locations as might be found within refineries, wastewater treatment plants, etc. The enclosure includes a door 78 that can be opened to access the valve controller's electronics and wiring terminals. In particular, the door provides access to the loop controllers 28, 30, 32 so that they can be replaced. The loop controllers plug into a backplane board 79 and can be easily withdrawn and replaced as needed. For example, the loop controllers 28, 30, 32 are embodied as modules or printed circuit boards having a connector that plugs into a mating connector on the backplane board 79. The loop controllers 28, 30, 32 can include additional hardware (screws, locking tabs, etc.) for fixing the loop controller in place within the valve controller 14. The backplane board 79 can include the primary controller 34, or portions of the primary controller (e.g., the SP circuitry 34b). Further, the primary controller 34, or portions of the primary controller (e.g., the VC circuitry 34a) can be located on a module or printed circuit board that plugs into the backplane board 79.

The valve controller 14 includes a plurality of input and output interfaces 80, 82 for providing and/or receiving the I/O discussed above (e.g., analog signals, relay signals, digital communication signals, etc.) The input and output interfaces can be located on removable modules or printed circuit boards that plug into the valve controller 14. Input and output interfaces can also be located on the backplane board 79, or elsewhere within the valve controller 14. In certain embodiments, input and output interfaces are located on the enclosure 76 and are accessible with the door 78 closed.

The valve controller 14 further includes power supply circuitry and associated terminals for receiving and distributing operating power and generating useful voltage levels. For example, the valve controller 14 includes power supply terminals 84 for receiving AC utility power. DC power supplies 86, 88 generate regulated DC power for use by the valve controller.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A device for controlling an actuator, comprising:
an input interface for receiving a plurality of input signals, the input signals including a setpoint command signal and a feedback signal;
an output interface for providing a drive signal to the actuator;
a primary controller;
a first redundant loop controller that processes the setpoint command signal and the feedback signal to generate a first actuator control signal;
a second redundant loop controller that processes the setpoint command signal and the feedback signal to generate a second actuator control signal; and
a third redundant loop controller that processes the setpoint command signal and the feedback signal to generate a third actuator control signal,
wherein the primary controller compares the first actuator control signal, the second actuator control signal, and the third actuator control signal to determine whether at least one of the actuator control signals is substantially similar to another of the actuator control signals,
wherein the device outputs the drive signal to the actuator according to the at least one of the actuator control signals that has been determined by the primary controller to be substantially similar to another of the actuator control signals, and
wherein any one of the first redundant loop controller, the second redundant loop controller, and the third redundant loop controller is hot swappable with a replacement loop controller such that loop controller redundancy is operatively maintained by the device in controlling the actuator while one of the redundant loop controllers is hot swapped.

2. The device of claim 1, wherein the drive signal to the actuator is generated by one of the first redundant loop controller, the second redundant loop controller, and the third redundant loop controller.

3. The device of claim 2, wherein the device outputs the drive signal to the actuator while one of the redundant loop controllers is hot swapped.

4. The device of claim 1, wherein the primary controller performs two-out-of-three voting using the first actuator control signal, the second actuator control signal, and the third actuator control signal to determine whether at least one of the actuator control signals is substantially similar to another of the actuator control signals.

5. The device of claim 1, wherein the actuator is a valve actuator, and the device and the valve actuator together maintain normal control and actuation of a valve while one of the redundant loop controllers is hot swapped and while the replacement loop controller is subsequently calibrated by the device.

6. The device of claim 5, wherein the replacement loop controller is calibrated by the device without fully stroking the valve to calibrate the replacement loop controller after the replacement loop controller is installed in the device.

7. A device for controlling an actuator, comprising:
- an input interface for receiving a plurality of input signals, the input signals including a setpoint command signal and a feedback signal;
- an output interface for providing a drive signal to the actuator;
- a primary controller;
- a first redundant loop controller that processes the setpoint command signal and the feedback signal to generate a first actuator control signal;
- a second redundant loop controller that processes the setpoint command signal and the feedback signal to generate a second actuator control signal;
- a third redundant loop controller that processes the setpoint command signal and the feedback signal to generate a third actuator control signal; and
- a memory associated with at least one of the primary controller, the first redundant loop controller, the second redundant loop controller, and the third redundant loop controller, the memory storing calibration parameters for processing the setpoint command signal and the feedback signal;
- wherein the primary controller compares the first actuator control signal, the second actuator control signal, and the third actuator control signal to determine whether at least one of the actuator control signals is substantially similar to another of the actuator control signals,
- wherein the device outputs the drive signal to the actuator according to the at least one of the actuator control signals that has been determined by the primary controller to be substantially similar to another of the actuator control signals, and
- wherein any one of the first redundant loop controller, the second redundant loop controller, and the third redundant loop controller is hot swappable with a replacement loop controller, and the device loads the calibration parameters for processing the setpoint command signal and the feedback signal from the memory into the replacement loop controller when one of the redundant loop controllers is hot swapped.

8. The device of claim 7, wherein the drive signal to the actuator is generated by one of the first redundant loop controller, the second redundant loop controller, and the third redundant loop controller.

9. The device of claim 8, wherein the device outputs the drive signal to the actuator while one of the redundant loop controllers is hot swapped.

10. The device of claim 7, wherein the primary controller performs two-out-of-three voting using the first actuator control signal, the second actuator control signal, and the third actuator control signal to determine whether at least one of the actuator control signals is substantially similar to another of the actuator control signals.

11. The device of claim 7, wherein the actuator is a valve actuator, and the device and the valve actuator together maintain normal control and actuation of a valve while one of the redundant loop controllers is hot swapped and while the replacement loop controller is subsequently calibrated.

12. The device of claim 11, wherein the replacement loop controller is calibrated by the device without fully stroking the valve to calibrate the replacement loop controller after the replacement loop controller is installed in the device.

13. The device of claim 7, wherein loop controller redundancy is operatively maintained by the device in controlling the actuator while one of the redundant loop controllers is hot swapped.

14. The device of claim 13, wherein the calibration parameters loaded into the replacement loop controller match parameters in the one of the redundant loop controllers that is hot swapped.

15. The device of claim 14, wherein the calibration parameters loaded into the replacement loop controller fully calibrate the replacement loop controller to control the actuator such that additional calibration of the replacement loop controller is unnecessary.

16. A device for controlling an actuator, comprising:
- an input interface for receiving a plurality of input signals, the input signals including a setpoint command signal and a feedback signal;
- an output interface for providing a drive signal to the actuator;
- a first redundant loop controller that processes the setpoint command signal and the feedback signal to generate a first actuator control signal;
- a second redundant loop controller that processes the setpoint command signal and the feedback signal to generate a second actuator control signal; and
- a third redundant loop controller that processes the setpoint command signal and the feedback signal to generate a third actuator control signal;
- a memory associated with at least one of the first redundant loop controller, the second redundant loop controller, and the third redundant loop controller, the memory storing calibration parameters for processing the setpoint command signal and the feedback signal,
- wherein the device outputs the drive signal to the actuator according to at least one of the actuator control signals, and
- wherein any one of the first redundant loop controller, the second redundant loop controller, and the third redundant loop controller is hot swappable with a replacement loop controller such that loop controller redundancy is operatively maintained by the device in controlling the actuator while one of the redundant loop controllers is hot swapped, and the device loads the calibration parameters for processing the setpoint command signal and the feedback signal from the memory into the replacement loop controller when one of the redundant loop controllers is hot swapped.

17. The device of claim 16, wherein the drive signal to the actuator is generated by one of the first redundant loop controller, the second redundant loop controller, and the third redundant loop controller.

18. The device of claim 17, wherein the device outputs the drive signal to the actuator while one of the redundant loop controllers is hot swapped.

19. The device of claim 16, wherein the actuator is a valve actuator, and the device and the valve actuator together maintain normal control and actuation of a valve while one of the redundant loop controllers is hot swapped and while the replacement loop controller is subsequently calibrated.

20. The device of claim 19, wherein the replacement loop controller is calibrated by the device without fully stroking the valve to calibrate the replacement loop controller after the replacement loop controller is installed in the device.

21. The device of claim 16, wherein the calibration parameters loaded into the replacement loop controller match parameters in the one of the redundant loop controllers that is hot swapped.

22. The device of claim 21, wherein the calibration parameters loaded into the replacement loop controller fully calibrate the replacement loop controller to control the actuator such that additional calibration of the replacement loop controller is unnecessary.

23. A method for controlling a valve actuator by a valve controller, comprising the steps of:
receiving a plurality of input signals, the input signals including an setpoint command signal and a feedback signal;
generating a first actuator control signal by a first redundant loop controller based on the setpoint command signal and the feedback signal;
generating a second actuator control signal by a second redundant loop controller based on the setpoint command signal and the feedback signal;
generating a third actuator control signal by a third redundant loop controller based on the setpoint command signal and the feedback signal;
comparing the first actuator control signal, the second actuator control signal, and the third actuator control signal;
determining whether at least one of the actuator control signals is substantially similar to another of the actuator control signals;
outputting a drive signal to the valve actuator according to the at least one of the actuator control signals that is determined to be substantially similar to another of the actuator control signals;
receiving, by the valve controller, a replacement loop controller as a hot swapped replacement for one of the first redundant loop controller, the second redundant loop controller, and the third redundant loop controller;
maintaining redundant control of the valve actuator by two of the first redundant loop controller, the second redundant loop controller, and the third redundant loop controller while said one of the first redundant loop controller, the second redundant loop controller, and the third redundant loop controller is hot swapped; and
automatically loading stored calibration parameters for processing the setpoint command signal and the feedback signal into the replacement loop controller, wherein the calibration parameters match parameters in said one of the first redundant loop controller, the second redundant loop controller, and the third redundant loop controller that is hot swapped.

24. The method of claim 23, wherein the step of determining whether at least one of the actuator control signals is substantially similar to another of the actuator control signals includes two-out-of-three voting.

25. The method of claim 23, wherein the valve controller and the valve actuator together maintain normal control and actuation of a valve while said one of the first redundant loop controller, the second redundant loop controller, and the third redundant loop controller is hot swapped and while the replacement loop controller is subsequently automatically calibrated.

* * * * *